United States Patent
Green et al.

(10) Patent No.: US 10,490,066 B2
(45) Date of Patent: Nov. 26, 2019

(54) DYNAMIC TRAFFIC CONTROL

(71) Applicant: X Development LLC, Mountain View, CA (US)

(72) Inventors: Julian Green, San Francisco, CA (US); Michael Jason Grundmann, San Jose, CA (US); Sylvia Joan Smullin, Menlo Park, CA (US); Joseph Pieter Stefanus van Grieken, San Francisco, CA (US)

(73) Assignee: X Development LLC, Mountain View, CA (US)

( * ) Notice: Subject to any disclaimer, the term of this patent is extended or adjusted under 35 U.S.C. 154(b) by 282 days.

(21) Appl. No.: 15/393,981

(22) Filed: Dec. 29, 2016

(65) Prior Publication Data
US 2018/0190111 A1      Jul. 5, 2018

(51) Int. Cl.
*G08G 1/00*      (2006.01)
*G08G 1/01*      (2006.01)
(Continued)

(52) U.S. Cl.
CPC .......... *G08G 1/0145* (2013.01); *G06K 9/00* (2013.01); *G06K 9/00771* (2013.01);
(Continued)

(58) Field of Classification Search
CPC .... G08G 1/0145; G08G 1/0133; G08G 1/015; G08G 1/052; G08G 1/087; G08G 1/056;
(Continued)

(56) References Cited

U.S. PATENT DOCUMENTS 6,366,219 B1 *    4/2002    Hoummady ............. G08G 1/04
                                                                        340/907
8,373,578 B1      2/2013    Sikora et al.
(Continued)

FOREIGN PATENT DOCUMENTS

WO      WO 2009/126120      10/2009
WO      WO 2016/098361      6/2016

OTHER PUBLICATIONS

'documentslide.com' [online]. "Traffic Light Control Using Reinforcement Learning," Mar. 2015 [retrieved on Dec. 27, 2016] Retrieved from Internet: URL<http://documentslide.com/documents/traffic-light-control-using-reinforcement-learning-daniel-goldberg-andrew-elstein-final-presentation.html> 16 pages.
(Continued)

*Primary Examiner* — Jason Holloway
(74) *Attorney, Agent, or Firm* — Fish & Richardson P.C.

(57) ABSTRACT

In some implementations, a method includes receiving, by one or more processing devices configured to control a traffic signal at an intersection of roads, camera data providing images of the intersection, the processing devices being located proximate to the intersection, using one or more local machine learning models to identify objects at the intersection and paths of the objects based on the camera data, providing traffic data generated from outputs of the one or more local machine learning models to a remote traffic planning system over a network, receiving, from the remote traffic planning system, a remote instruction for the traffic signal determined using one or more remote machine learning models, and providing a control instruction to the traffic signal at the intersection that is determined based on (i) the remote instruction from the remote traffic planning system, and (ii) a local instruction generated by the processing devices.

20 Claims, 4 Drawing Sheets

(51) Int. Cl.
    *G08G 1/04*     (2006.01)
    *G08G 1/081*     (2006.01)
    *G06N 20/00*     (2019.01)
    *G06K 9/00*     (2006.01)
    *G08G 1/015*     (2006.01)
    *G08G 1/052*     (2006.01)
    *G08G 1/056*     (2006.01)
    *G08G 1/08*     (2006.01)
    *G08G 1/087*     (2006.01)

(52) U.S. Cl.
    CPC ............ *G06N 20/00* (2019.01); *G08G 1/015* (2013.01); *G08G 1/0116* (2013.01); *G08G 1/0129* (2013.01); *G08G 1/0133* (2013.01); *G08G 1/04* (2013.01); *G08G 1/052* (2013.01); *G08G 1/056* (2013.01); *G08G 1/08* (2013.01); *G08G 1/081* (2013.01); *G08G 1/087* (2013.01)

(58) Field of Classification Search
    CPC ........ G08G 1/08; G08G 1/081; G08G 1/0116; G08G 1/0129; G08G 1/04; G06N 20/00; G06K 9/00771; G06K 9/00
    See application file for complete search history.

(56) References Cited

U.S. PATENT DOCUMENTS

| | | | | |
|---|---|---|---|---|
| 9,805,595 | B1* | 10/2017 | Liebinger Portela | G08G 1/0145 |
| 9,965,951 | B1* | 5/2018 | Gallagher | G08G 1/0145 |
| 2002/0008637 | A1* | 1/2002 | Lemelson | G08G 1/07 340/907 |
| 2003/0063016 | A1* | 4/2003 | Mathias | G08G 1/08 340/907 |
| 2006/0181433 | A1* | 8/2006 | Wolterman | G08G 1/08 340/917 |
| 2008/0086258 | A1* | 4/2008 | Wall | G08G 1/081 701/117 |
| 2008/0094250 | A1* | 4/2008 | Myr | G08G 1/04 340/909 |
| 2011/0191011 | A1* | 8/2011 | McBride | H04L 41/0823 701/117 |
| 2012/0262304 | A1 | 10/2012 | Cripps | |
| 2014/0032089 | A1* | 1/2014 | Aoude | G08G 1/00 701/117 |
| 2017/0158193 | A1* | 6/2017 | Lopez | B60W 40/04 |

OTHER PUBLICATIONS

'dot.gov' [online] "Traffic Signal Timing Manual: Chapter 2—Office of Operations," Oct. 2015, [retrieved on Dec. 27, 2016] Retrieved from the Internet: URL<http://ops.fhwa.dot.gov/publications/fhwahop08024/chapter2.htm> 15 pages.

'news.mit.edu' [online]. "Better traffic signals can cut greenhouse gas emissions," Mar. 2015 [retrieved on Dec. 27, 2016] Retrieved from the Internet: URL< http://news.mit.edu/2015/smarter-stoplights-cut-greenhouse-gas-0331> 3 pages.

'news.mit.edu' [online]. "Traffic lights: There's a better way," Jul. 2014, [retrieved on Dec. 27, 2016] Retrieved from the Internet: URL< http://news.mit.edu/2014/traffic-lights-theres-a-better-way-0707>.

Bakker et al. "Traffic Light Control by Multiagent Reinforcement Learning Systems," Interactive Collaborative Information Systems, Springer Berlin Heidelberg, 2010, 37 pages.

Baluja et al. "Approximating the Effects of Installed Traffic Lights: A Behaviorist Approach Based on Travel Tracks," 2015 IEEE 18th International Conference on Intelligent Transportations Systems, 2015, 8 pages.

Glick. "Reinforcement Learning for Adaptive Traffic Signal Control," Stanford University, 2015, 8 pages.

Medina et al. "Agent-based Traffic Management and Reinforcement Learning in Congested Intersection Network," USDOT Region V Regional University Transportation Center Final Report, University of Illinois at Urbana-Champaign, Aug. 2012, 152 pages.

Oliveira et al. "Reinforcement Learning-based Control of Traffic Lights in Non-stationary Environments: A Case Study in a Microscopic Simulator," In EUMAS, 2006, 12 pages.

Pham et al. "Learning Coordinated Traffic Light Control," Proceedings of the Adaptive and Learning Agents workshop, 2013, vol. 10, 8 pages.

International Search Report and Written Opinion issued in International Application No. PCT/US2017064002, dated Mar. 9, 2018, 15 pages.

\* cited by examiner

DYNAMIC TRAFFIC CONTROL

BACKGROUND

This specification generally relates to traffic indicators. Traffic indicators alert vehicles and other objects or travellers on a road. Traffic indicators may be traffic lights, traffic signs, audio cues for crossing, etc. Traffic lights are controlled by local controllers that instruct the traffic lights to change phase (e.g., from red to green). The timing of traffic lights in adjacent intersections affect traffic congestion and the travel and wait time of drivers.

SUMMARY

In some implementations, a traffic light control system can regulate the phases of traffic lights at an intersection, or at multiple intersections, to ensure that traffic flows smoothly and safely. The traffic light control system can determine appropriate patterns of phases for traffic lights based on local traffic data from the particular intersections at which the traffic lights are being controlled, combined with global instructions generated from analyzing traffic data from many other intersections.

For example, the phases of traffic lights can be timed to reduce travel time for drivers by coordinating traffic light phases such that vehicles travelling through successive intersections encounter a string of green lights, or a dynamic green wave. The phases of traffic lights can be controlled to protect pedestrians at an intersection as they cross the intersection by extending the green light phase of a traffic light at the intersection that controls traffic flow in the pedestrian's direction of travel. In some examples, lights that tell pedestrians, bicyclists, and other non-vehicular travellers when it is safe to cross can be controlled to protect the pedestrians, bicyclists, and other non-vehicular travellers. For example, the lights can be controlled to provide non-vehicular travellers lead intervals (e.g., a head start) over vehicles, or otherwise balance timing with vehicles that would be turning through the non-vehicular traveller's path.

The traffic light control system can control the phases of traffic lights to reduce dangerous driving habits and encourage driving safely. For example, by coordinating traffic lights at adjacent intersections to change phases such that a vehicle travelling at a posted speed limit encounters a string of green lights, drivers can be motivated to drive at the posted speed limit. Additionally, coordinated traffic lights that reduce traffic congestion also reduce the need to expand roads to accommodate disproportionately large amounts of traffic at peak travelling times, as well as reducing fuel consumption and pollution by vehicles. Furthermore, by reducing travel times, the traffic light control system can reduce driver frustration.

The combination of global instructions and local traffic data allows the traffic control system to learn from traffic situations at multiple intersections while maintaining flexibility based on local conditions. For example, global instructions may suggest that reducing the length of red light phases at traffic lights are shown to reduce traffic. For many intersections, the global instructions may alleviate traffic congestion. However, local data at a particular intersection may suggest that a bicyclist is currently crossing the intersection, and that the bicyclist will not be able to finish crossing the intersection safely if the traffic light enters a green light phase. The traffic control system may then alter instructions to the traffic light to extend the length of the red light phase of the traffic light until the bicyclist finishes crossing the intersection. In some examples, separate lights, such as walk lights for pedestrians, are controlled to protect non-vehicular travellers.

According to one innovative aspect of the subject matter described in this specification, a method for controlling traffic lights is provided, where sensor data providing images of a traffic intersection is collected by cameras and/or other sensors at or near the intersection. Processing devices that control a traffic light at the intersection may receive the sensor data and identify objects at the intersection using one or more local machine learning models. In some examples, the processing devices may determine an object's location relative the intersection, direction of travel, velocity, etc. A traffic planning system remote from the intersection may receive traffic data, including identified objects, generated from the output of the local machine learning models over a network. The remote planning system may generate instructions and provide the instructions to the processing devices that control the traffic light. In response to receiving instructions from the remote planning system, the processing devices that control the traffic light at the intersection may generate local control instructions for the traffic light. A traffic light controller of the traffic light at the intersection may generate and provide a control instruction based on the instructions from the remote planning system and the local instructions.

In general, one innovative aspect of the subject matter described in this specification can be embodied in a method that includes receiving, by one or more processing devices configured to control a traffic signal at an intersection of roads, camera data providing images of the intersection, the one or more processing devices being located proximate to the intersection, using, by the one or more processing devices, one or more local machine learning models to identify objects at the intersection and paths of the objects based on the camera data, providing, by the one or more processing devices, traffic data generated from outputs of the one or more local machine learning models to a remote traffic planning system over a network, receiving, by the one or more processing devices and from the remote traffic planning system, a remote instruction for the traffic signal determined using one or more remote machine learning models, and providing, by the one or more processing devices, a control instruction to the traffic signal at the intersection that is determined based on (i) the remote instruction from the remote traffic planning system, and (ii) a local instruction generated by the one or more processing devices.

Implementations may include one or more of the following features. For example, the method may include accessing, by the remote planning system, safety rules indicating requirements for the traffic signal, modifying, by the remote traffic planning system, the remote instruction based on the safety rules to obtain a modified instruction, and providing, by the one or more processing devices, the modified instruction to the traffic signal. In some examples, the method includes determining, by the one or more processing devices and using the one or more local machine learning models and further based on the camera data, a classification for a condition at the intersection, generating, by the one or more processing devices, a local instruction based on the classification, and altering the remote instruction based on the local instruction, wherein providing the control instruction to the traffic signal includes providing the altered remote instruction.

In some examples, the method includes determining, by the one or more processing devices and using the one or more local machine learning models and further based on the camera data and phase data for the traffic signal indicating a current phase of the traffic signal, a classification for a condition at the intersection, generating, by the one or more processing devices, a local instruction based on the classification, and overriding, based on the local instruction, the remote instruction. In some examples, the method includes determining, by the one or more processing devices and for each of multiple different paths through the intersection, the multiple different paths representing multiple different origin-destination pairs, a count of objects of a particular type traversing the path, wherein providing the traffic data includes providing the count of objects of the particular type traversing the path. The method of claim 5, wherein providing the traffic data comprises providing data indicating a speed of the counted objects of a particular type.

In some examples, providing the traffic data includes providing one or more measures indicating relative amounts of vehicles taking different paths through the intersection. In some examples, the remote planning system uses reinforcement learning by receiving and taking into account traffic data received from other intersections located proximate to the intersection.

In some examples, the method includes dynamically altering, by the one or more processing devices and based on the traffic instruction, the traffic signal. In some examples, the one or more processing devices are located at the intersection. In some examples, the method includes determining, by the one or more processors and based, at least in part, on the traffic data, the local instruction. In some examples, the method includes providing, by the one or more processing devices and periodically, at an interval, traffic data generated from outputs of the one or more local machine learning models to a remote traffic planning system over a network.

In some examples, the traffic data is collected by a sensor located to detect conditions at the intersection. In some examples, the sensor is a camera, and the camera has a view of an entrance and an exit of the intersection. In some examples, the sensor is a camera including a conical mirror, and the camera has a 360° view of the intersection. In some examples, the sensor includes at least one of a lidar or a radar system.

In some examples, the method includes receiving customized machine learning model parameters for the local machine learning model. In some examples, the method includes determining, by a real-time operating system and based on safety rules indicating requirements for the traffic signal, the control instruction to the traffic signal at the intersection, and controlling, by the real-time operating system, the traffic signal. In some examples, the method includes using, by the one or more processing devices, the one or more local machine learning models to classify a condition at the intersection or to assess a speed of an identified object. In some examples, the method includes storing, by the one or more processors and in a database, parameters for generating local control instructions, accessing, by the one or more processors, the database to retrieve the parameters, and generating, by the one or more processors and based on the parameters and an output of the one or more local machine learning models, a particular local control instruction.

The subject matter described in this specification can be implemented in particular embodiments so as to realize one or more of the following advantages. The disclosed system provides flexibility, allowing use of sensor systems such as lidar, radar, range imaging, microwave sensors, inductive loops, black and white cameras, color cameras such as red green blue (RGB) cameras, infrared (IR) cameras, multispectral cameras, hyper-spectral cameras, directional sensors, microphones, etc., or various other sensors or combinations of sensors, to determine traffic data, such as the number of vehicles at a crossing, the number of vehicles turning, the paths taken by the vehicles, etc. In some implementations, other types of data may be collected. For example, data associated with traffic indicators, including traffic lights, railroad crossings, road barriers, flags, traffic signs, audio cues, signals inside of vehicles, etc. may be collected. Various other sensors, or combinations of sensors may be used. The system reduces wait times of vehicles at traffic intersections by optimizing and controlling individual traffic lights to regulate the flow of traffic. Further advantages include increasing traffic throughput and safety. The system can reduce the number of stops that a traveller, vehicular or otherwise, must make at traffic lights, and can reduce traffic congestion. By analyzing the traffic data collected, the system provides a better understanding of traffic flows of specific modes. For example, pedestrians may have a different traffic flow pattern than buses, which may have a different traffic flow pattern than passenger cars. The system can be used to develop a better understanding of traffic safety at intersections by monitoring traffic behavior. For example, the system may identify precipitating factors of near-collisions, accidents, etc. In some examples, the system can use signal timing to provide priority to certain travellers. For example, the system may allow pedestrians to cross before other non-vehicular travellers, bicyclists to begin travelling while vehicles are still stopped, etc. In some examples, additional lights, such as a warning light can be used. For example, a warning light may be added to a traffic signal to indicate near-collisions and alert drivers that a collision nearly occurred.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

In some implementations, a traffic control system includes multiple levels of machine learning processing. A remote system, e.g., a server system or cloud-based system, may use reinforcement learning to coordinate traffic control among many different traffic lights in an area such as a city. In addition, local processing systems running other machine learning models can be distributed throughout the area, for example, with a local system at each road intersection. The local systems observe conditions at their respective intersections and provide traffic data to the remote system, which uses its learning models to generate instructions that are sent to the local systems. This arrangement allows each traffic light to benefit from network-level coordination or optimization, while also retaining the flexibility for individual traffic lights and intersections to respond to local conditions with local machine learning models. For example, the instructions of the remote system may promote the overall efficiency and traffic throughput over a large area, and each local processing unit may be able to override those instructions to respond to local conditions such as an elderly person crossing the street or an emergency vehicle approaching.

In some implementations, a traffic control system controls a traffic light at a traffic intersection. In some implementations, each traffic light is controlled by a local processing system that runs a real-time operating system (RTOS). This local processing system can be located proximate to the intersection where the controlled traffic light(s) are located. The RTOS may receive instructions from other modules in the local processing system, such as a local planning module that is part of the local processing system, and a remote planning system that sends data over a network. The local planning module may use local machine learning models to identify objects in the intersection and to generate control instructions for the traffic light based on local conditions at the intersection. The remote planning system may use remote machine learning models to generate control instructions for the traffic light based on conditions detected at many different intersections. For example, the remote planning system may receive traffic data for multiple traffic intersections and perform reinforcement learning to improve traffic flow in a large area that includes many intersections.

Figure 1:
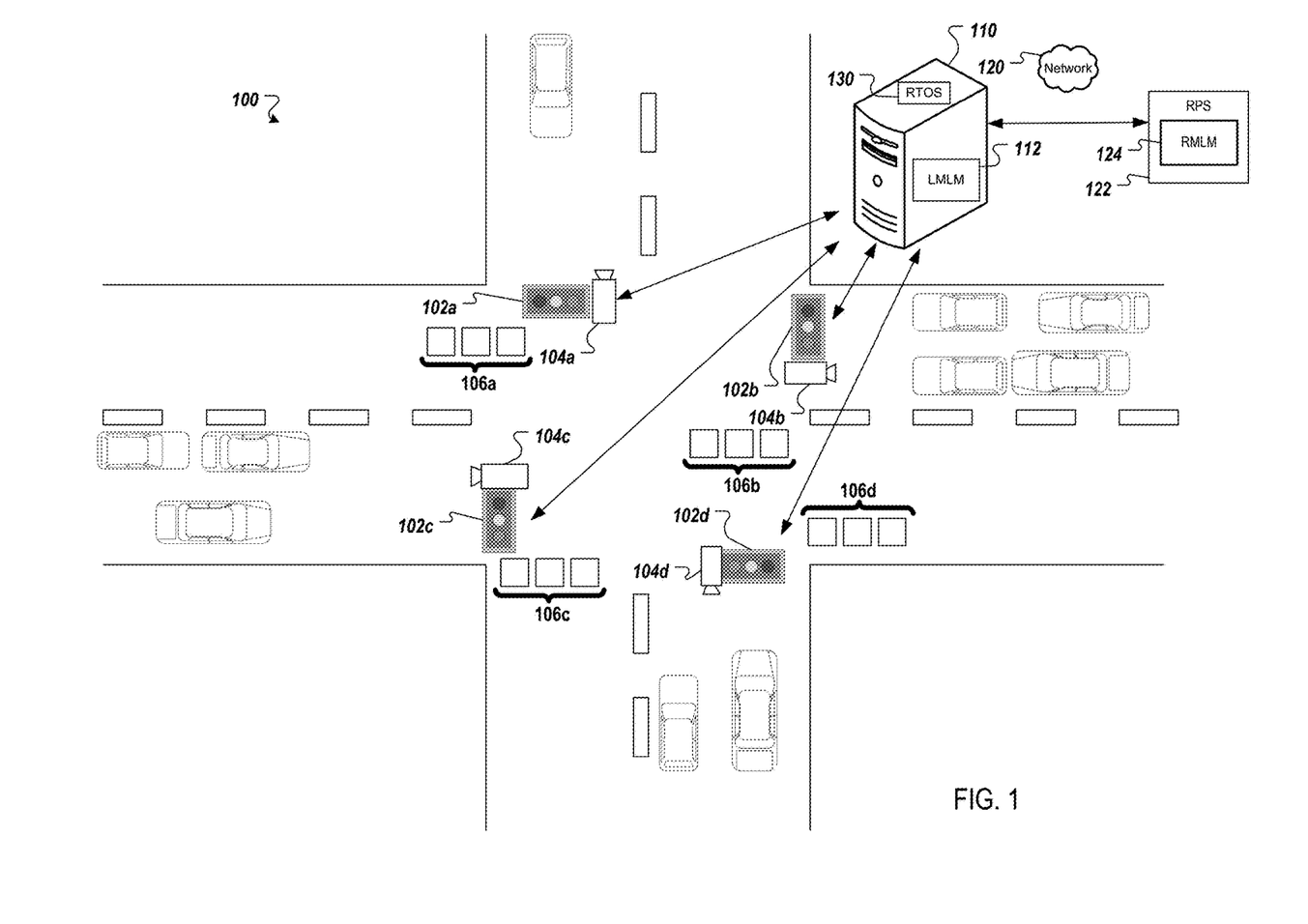
FIG. 1 is an illustration of an example traffic intersection at which a traffic light control system is implemented.

FIG. 1 shows an illustration of an example traffic intersection 100 at which the traffic light control system is implemented. In general, a traffic intersection includes one or more traffic lights, and connects two or more roads. Nevertheless, the techniques described herein are applicable to the control of any traffic signal, including a single traffic light placed in the middle of a straight road. As an additional example, a traffic intersection can be a three-way intersection that connects the end of one road to a length of another road, and can include three traffic lights—one for each road segment or "arm" extending from it. In some implementations, traffic intersections can include more or fewer arms extending from it. In this particular example, a four-way traffic intersection 100 is shown that connects two roads. A separate traffic light 102a-d is shown for each arm of the intersection.

In some examples, each arm of an intersection may include different sets of lights. For example, an intersection may include a set of lights for bicyclists, a set of lights for passenger cars, a set of lights for buses, etc. In some examples, traffic lights include auditory cues in addition to or in the alternative to visual cues. For example, traffic lights may include a walk light in addition to speaker output indicating it is safe to cross. In some examples, traffic lights include accessibility features, such as vibration modules, etc.

In this particular example, various sensors, including camera 104a-d and other sensors 106a-d, are shown to be proximate to each traffic light 102a-d. The cameras 104 capture information, such as images and other sensor data, for each arm of the intersection. In some examples, several cameras or other sensors may be placed at different locations that are not directly adjacent the traffic lights, to capture information about the intersection. In some implementations, there may be fewer sensors than one per traffic light. For example, a single sensor device or camera may capture information about several lanes, arms, or regions of a roadway so multiple sensors are not needed. In some implementations, there may be more cameras than one per traffic light.

In some examples, the cameras 104 are video cameras that capture video data of the intersection. In some examples, the cameras 104 capture still image data of the intersection. In some examples, a camera has a 360° view of the intersection can be used. This type of camera may be positioned to capture information about the entire intersection. In some examples, the cameras 104 have a view of the entrance and the exit of the intersection. The sensors 106 capture traffic data through other types of sensing than image processing. For example, the sensors 106 may include range imaging sensors, microwave sensors, inductive loops, black and white cameras, RGB cameras, IR cameras, multi-spectral cameras, hyper-spectral cameras, directional sensors, radar, lidar, audio sensors such as microphones, and/or other sensors. Various other sensors may be used.

The captured traffic data from each of the individual traffic lights 102a-d may be transmitted to a local control system 110. In some examples, each intersection has a local control system. In some examples, a local control system is responsible for two or more intersections. For example, a local control system may control a cluster of neighboring intersections. In some examples, a local control system may control multiple intersections located remotely from each other. In some examples, a local control system is responsible for controlling a portion of an intersection. For example, a local control system may control one of four traffic lights of an intersection, while a second local control system may control the other three of four traffic lights of an intersection. Different local control systems may control different numbers of traffic lights.

In some examples, the local control system 110 includes one or more local machine learning models 112. The local machine learning models 112 are used to process the received traffic data. In some examples, the local machine learning models 112 can store data within a memory of the local control system. In some examples, the local control system 110 stores metadata determined by the local machine learning models 112 instead of sensor data collected by cameras 104 and/or sensors 106. For example, the local control system 110 may store the number of vehicles turning right from the western arm of the intersection, the number of vehicles that have travelled through the intersection in the last five minutes, etc.

The local machine learning models 112 may be models which accept sensor data collected by cameras and/or other sensors as inputs. The local machine learning models 112 may use any of a variety of models such as decision trees, linear regression models, logistic regression models, neural networks, classifiers, support vector machines, inductive logic programming, ensembles of models (e.g., using techniques such as bagging, boosting, random forests, etc.), genetic algorithms, Bayesian networks, etc., and can be trained using a variety of approaches, such as deep learning, perceptrons, association rules, inductive logic, clustering, maximum entropy classification, learning classification, etc. In some examples, the local machine learning models 112 may use supervised learning. In some examples, the local machine learning models 112 use unsupervised learning.

In some examples, the local machine learning models 112 are used to identify objects at the intersection based on the received traffic data. For example, the local machine learning models 112 can be trained to recognize particular types of objects, such as vehicles (e.g., passenger vehicles, buses, cargo trucks, etc.), bicycles, pedestrians, debris, etc. In some examples, the local machine learning models 112 can identify details of the identified objects, such as the make, model, license plate number, etc. of a vehicle; characteristics of pedestrians; the number of horses pulling a carriage; size of debris or obstructions; etc. In some examples, the local machine learning models 112 can be trained to recognize traffic scenes, such as an accident, construction, a broken down vehicle, a pedestrian waiting to cross, an emergency vehicle approaching, etc. In some examples, the local machine learning models 112 can be trained to recognize objects, scenes, etc. inside of the intersection as well as in adjacent streets. For example, the local machine learning models 112 can be trained to identify an emergency response vehicle approaching the intersection from an adjacent street. In some examples, the local machine learning models 112 can determine the velocity, direction, and acceleration of vehicles passing through the intersection.

The local machine learning models 112 can identify the number of vehicles passing through the intersection from a certain path. For example, the local machine learning models 112 can determine that five vehicles are travelling from the western road segment of the intersection, that three vehicles are travelling from the southern road segment of the intersection, and no vehicles are travelling from either the eastern road segment or the northern road segment of the intersection. The local machine learning models 112 can determine the velocity, direction, and acceleration of vehicles passing through the intersection.

The local machine learning models 112 can generate a measure of vehicles turning from a certain road segment in a certain direction. Measures of vehicles travelling in different paths can be represented as turn fractions. Turn fractions for each road segment of an intersection indicate the fraction of vehicles that have turned in a certain direction. For example, four vehicles may travel toward the intersection on the northern road segment, and three of the four vehicles may turn left onto the eastern road segment. As a result, a turn fraction for the left turns for the northern segment would be ¾ or 0.75. For each road segment connecting to an intersection, a turn fraction measure may be determined for each possible path through the intersection, e.g., a left turn fraction, a right turn fraction, a straight path fraction, etc. The total of the turn fractions for a certain road segment of an intersection is 1, which represents that the combined turn fractions represent an aggregate measure of the direction of travel of each vehicle travelling from the road segment over a period of time.

The local machine learning models 112 can identify traffic patterns, such as queues forming. For example, the local machine learning models 112 can determine, based on the received sensor data collected by cameras and/or other sensors, that traffic is building up since a large number of vehicles are waiting to enter the intersection. Similarly, the local machine learning models 112 could use the camera data to determine that there is a long queue of vehicles waiting to leave the intersection. In some instances, an intersection may be blocked and no vehicles are moving through the intersection, despite the traffic lights in the intersection being green. Such a situation may occur when traffic is backed up ahead of the current intersection such that vehicles cannot proceed through the intersection. This queue data may be generated and stored for future use to determine whether the queue conditions have cleared. In some examples, queue data is used as input to the local learning models 112 to update control instructions, improve pattern recognition, etc.

The local machine learning models 112 can identify paths taken by the identified vehicles. In some examples, the identified paths are defined as origin-destination pairs, which indicate the origin and the destination of each vehicle. In some examples, the origin-destination pairs are represented as vectors. The origin-destination pairs may be represented and organized in various forms, such as tables, lists, etc.

The local control system 110 generates local control instructions based on the traffic data gathered by the cameras at the intersections that the local control system is responsible for controlling. The local control system 110 uses the local machine learning models 112 to generate the local control instructions. In some examples, the local control instructions are customized for each traffic light based on the traffic data. For example, the local control system may receive traffic data indicating that very few vehicles are travelling from the northern and southern road segments of an intersection, while many vehicles are travelling from the western and eastern road segments of the intersection. In this particular example, the local control system 110 may generate an instruction lengthening the green light phase of the traffic lights at the western and eastern road segments of the intersection and generate an instruction shortening the green light phase of the traffic lights at the northern and southern road segments of the intersection. In some examples, the local control instructions are generalized for the intersection, intersections, or portions of an intersection the local control system is responsible for. For example, the local control system 110 may generate instructions shortening the yellow-to-red light phase transition time.

The traffic data generated by the local machine learning models 112 is transmitted to a remote traffic planning system 122. In some examples, the local control system 110 communicates with the remote planning system 122 through a network 120.

The remote planning system 122 can include separate remote machine learning models 124. The remote planning system 122 receives data from multiple intersections. The remote machine learning models 124 use the traffic data received from multiple intersections to determine global traffic control instructions. For example, the remote machine learning models 124 may use the traffic data received from multiple intersections in a particular district to determine that two seconds need to be added to the yellow-to-red light transition at all intersections within the district.

The remote machine learning models 124 may be models which accept sensor data collected by cameras and/or other sensors as inputs. The local machine learning models 112 may use any of a variety of models such as decision trees, linear regression models, logistic regression models, neural networks, classifiers, support vector machines, inductive logic programming, ensembles of models (e.g., using techniques such as bagging, boosting, random forests, etc.), genetic algorithms, Bayesian networks, etc., and can be trained using a variety of approaches, such as deep learning, perceptrons, association rules, inductive logic, clustering, maximum entropy classification, learning classification, etc. In some examples, the remote machine learning models 124 may use supervised learning. In some examples, the remote machine learning models 124 use unsupervised learning.

In some examples, the remote machine learning models 124 uses reinforcement learning to determine which actions to take in a particular traffic situation. For example, the remote machine learning models 124 may use a Markov decision process. In some examples, the remote machine learning models 124 may use approaches such as the criterion of optimality, brute force, direct policy search, or value functions, including Monte Carlo methods or temporal difference methods.

The remote planning system 122 may use the global traffic control instructions to generate control instructions to transmit to the local control system 110. In some examples, the control instructions are the same as the global traffic control instructions. In some examples, the control instructions from the remote planning system 122 can be customized for each set of traffic lights the local control system 110 controls.

The remote planning system 122 transmits the remote control instructions to the local control system 110 through the network 120. In some examples, the local control instructions generated by the local control system 110 are based on the control instructions received from the remote planning system 122. In some examples, the local control instructions override or modify the remote control instructions. For example, if the remote control instructions shorten the length of the green light phase, but the intersection that the local control system 110 is controlling is experiencing heavy delays, the local control system may instead generate local control instructions that lengthen the green light phase of traffic lights at the intersection.

The local control system includes an RTOS 130 that controls the traffic lights 102a-d. The RTOS 130 generates a control instruction for each of the traffic lights 102a-d based on the local control instruction, the remote control instruction, and traffic data of the intersection 100 collected by the cameras 104a-d and the sensors 106a-d.

Figure 2:
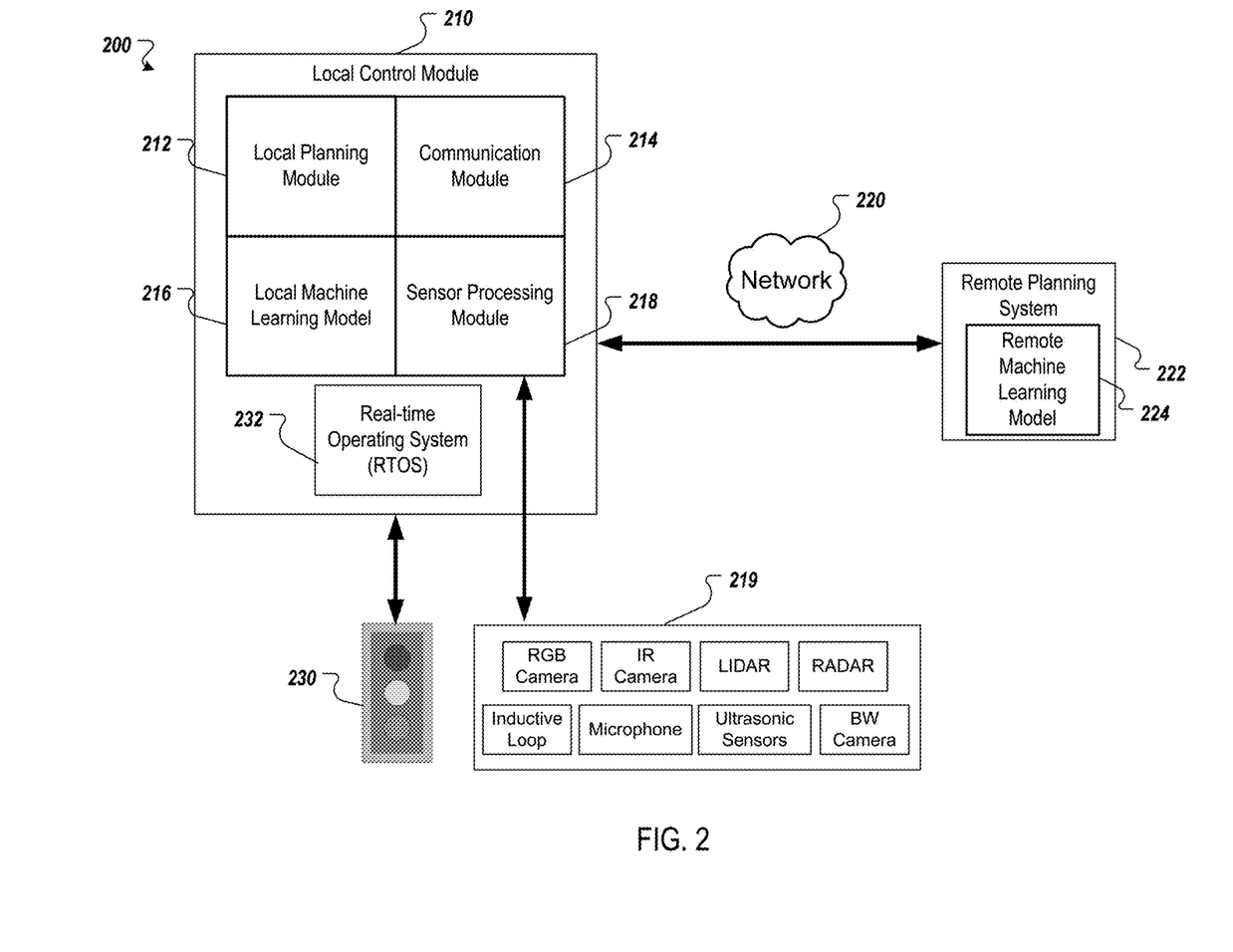
FIG. 2 is a block diagram of an example traffic light control system.

FIG. 2 illustrates a block diagram of an example traffic light control system 200. The control system 200 includes a local control system 210, a network 220, a remote planning system 222, and a traffic light 230.

The local control system 210 may be a local control system as described above with respect to FIG. 1. The local control system 210 includes a local planning module 212, a communication module 214, a local machine learning model 216, a sensor processing module 218, and an RTOS 232.

The local planning module 212 receives traffic data from the local machine learning model 216. Based on the traffic data received, the local planning module 212 generates control instructions for the traffic lights it controls. For example, the local planning module 212 may receive traffic data indicating that there are no vehicles at the western, eastern, or southern road segments of the intersection. The local planning module 212 may then extend the length of the green light phase for the traffic light for the northern road segment of the intersection, as well as the green turn light phase for the traffic light.

The communication module 214 is a communication device configured to exchange communications over a network (e.g., the network 220) and with traffic lights (e.g., the traffic light 230). The communication module 214 may be a wireless communication module configured to exchange wireless communications over the network 220. For example, the communication module 214 may be a wireless communication device configured to exchange communications over a wireless data channel and a wireless voice channel. In this example, the communication module 214 may transmit traffic data over a wireless data channel. The communication module 214 may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The communication module 214 may also be a wired communication module configured to exchange communications over the network 220 using a wired connection. For instance, the communication module may be a modem, a network interface card, or another type of network interface device. The communication module may be an Ethernet network card configured to enable the monitoring control unit 110 to communicate over a local area network and/or the Internet. The communication module 214 may be configured to communicate over device protocols specific to traffic lights for which it is responsible.

The local machine learning model 216 receives data from cameras proximate to the intersection or intersections for which the local control system 210 is responsible. In some examples, the local machine learning model 216 includes multiple machine learning models that perform different analyses. For example, the local machine learning model 216 may include a model for object identification, a model for path detection, a model for path prediction, a model for flow prediction, etc. In some examples, the local machine learning model 216 includes a single complex model that generates multiple types of traffic data.

In some examples, the local machine learning model 216 may be a model which accepts sensor data collected by cameras and/or other sensors as inputs. The local machine learning model 216 may use any of a variety of models such as decision trees, linear regression models, logistic regression models, neural networks, classifiers, support vector machines, inductive logic programming, ensembles of models (e.g., using techniques such as bagging, boosting, random forests, etc.), genetic algorithms, Bayesian networks, etc., and can be trained using a variety of approaches, such as deep learning, perceptrons, association rules, inductive logic, clustering, maximum entropy classification, learning classification, etc. In some examples, the local machine learning model 216 may use supervised learning. In some examples, the local machine learning model 216 use unsupervised learning.

The sensor processing module 218 receives and processes data received from the traffic light 230 and other traffic lights. Various sensors, including cameras that capture image data of the particular intersection, may be used. For example, range imaging sensors, microwave sensors, inductive loops, RGB cameras, IR cameras, multi-spectral cameras, hyper-spectral cameras, directional sensors, radar, lidar, audio sensors such as microphones, and/or other sensors or combinations of sensors may be used. The cameras may be video/photographic cameras or other type of optical sensing devices configured to capture images. For instance, the cameras may be configured to capture images of an area of the particular intersection. The cameras may be configured to capture single, static images of the area and also video images of the area in which multiple images of the area are captured at a relatively high frequency (e.g., thirty images per second). In some examples, cameras are used to capture image data, and may be controlled based on commands received from the traffic light 230, the local control system 210, the remote planning system 222, etc. The cameras take in light and create an image. In some examples, the cameras use light in the visible spectrum. In some examples, the cameras use light in other parts of the spectrum, such as IR light, UV light, etc.

The sensors, including cameras, may be triggered by several different types of techniques. For instance, a passive infrared (PIR) motion sensor may be built into the cameras and used to trigger the cameras to capture one or more images when motion is detected. The cameras also may include a microwave motion sensor built into the camera and used to trigger the cameras to capture one or more images when motion is detected. The cameras may have a "normally open" or "normally closed" digital input that can trigger capture of one or more images when other sensors in communication with the cameras detect motion or other events. In some implementations, the cameras receive a command to capture an image when other sensors detect motion or another potential traffic event. The cameras may receive the command from the traffic light 230, the local control system 210, the remote planning system 222, or directly from one of the other sensors.

In some examples, the sensors, including cameras, trigger integrated or external illuminators (e.g., IR, "white" lights, etc.) to improve image quality when the image is dark. An integrated or separate light sensor may be used to determine if illumination is desired and may result in increased image quality.

The sensors, including cameras, may be programmed with any combination of time/day schedules, or other variables to determine whether images should be captured or not when triggers occur. The cameras may enter a low-power mode when not capturing images. In this case, the cameras may wake periodically to check for inbound messages from the controller. The cameras may be powered by internal, replaceable batteries if located remotely from the local control unit 210 or traffic light 230. The cameras may employ a small solar cell to recharge the battery when light is available. Alternatively, the cameras may be powered by the controller's 112 power supply if the cameras are co-located with the controller.

One or more sensors or detectors may be used in the system 200 and input from these sensors may be processed by the sensor processing module 218. For example, the sensors 219 may include any or all of a contact sensor, a motion sensor, an induction loop sensor, an RGB camera, an IR camera, a black and white camera, lidar, radar, a microphone, an ultrasonic sensor, or any other type of sensor for sensing traffic. In some examples, the sensors may include a radio-frequency identification (RFID) sensor that identifies a particular article that includes a pre-assigned RFID tag.

The local machine learning model 216 transmits generated traffic data over the network 220 to the remote planning system 222. The example control system 200 includes a network 220, such as a local area network (LAN), a wide area network (WAN), the Internet, or a combination thereof. The network 220 connects the local control system 210 with the traffic light 230 and the remote planning system 222. The network may include 802.11 "Wi-Fi" wireless Ethernet (e.g., using low-power Wi-Fi chipsets), Bluetooth, networks that operate over AC wiring, or Category 5 (CAT5) or Category 6 (CAT6) wired Ethernet network. In some examples, the network 220 may be a mesh network constructed based on the devices connected to the mesh network.

The remote planning system 222 is located remotely from the local machine learning model 216 and may be a remote planning system as described above with respect to FIG. 1. The remote planning system 222 may receive traffic data from multiple local control systems. For example, the remote planning system 222 may be a central control system for an entire state's traffic system. In such examples, the remote planning system 222 may receive traffic data from various types of intersections with various traffic conditions. The remote planning system 222 uses the traffic data from the local control systems 210 to generate remote control data.

The remote planning system 222 includes one or more remote machine learning models 224. In some examples, the remote machine learning models 224 include one model for each type of analysis performed. For example, the remote machine learning models 224 may include a model for path pattern recognition, a model for congestion detection, a model for emergency planning and detection, etc. In some examples, the remote machine learning models 224 include one model for each subset of intersections under the purview of the remote planning system 222. For example, the remote machine learning models 224 may include one model for each state of the country, a model for each district of the state, a model for each intersection, etc.

The traffic light 230 may be a standard traffic light that is positioned at a traffic intersection and used to control the flow of traffic. In some examples, the traffic light 230 may be a crosswalk or pedestrian walk light. In some examples, the traffic light 230 may include turn signals. In some examples, the traffic light 230 may be or may include various traffic control devices, such as railroad crossing lights, high occupancy vehicle (HOV) lane lights, toll booth lights, etc.

The RTOS 232 is the real-time operating system of the traffic light 230. The RTOS 232 receives control instructions from the local planning module 212 and the remote planning system 222. One of the functions of the RTOS 232 is to enforce safety rules, e.g., to avoid unsafe conditions, such as green lights being shown simultaneously on perpendicular road segments. The RTOS 232 may override control instructions received from the local planning module 210 and/or the remote planning system 222 to comply with safety requirements.

In some implementations, the local planning module 212 receives and assesses the remote control instructions from the remote planning system 222. The local planning module 210 then modifies the received instruction if needed to address detected conditions in the intersection or passes it on to the RTOS 232, which carries the instruction from the local planning module 210 if it is safe to do so. In some implementations, instructions from the local planning module 212 and the remote planning system 222 are both provided to the RTOS 232 though the local control system 210, and the RTOS 232 determines which of the instructions, if any to carry out. Whether done by the RTOS 232 or the local planning module 212 or both, the local control system 210 can dynamically adjust traffic signal control based on traffic data local to the intersection at which the traffic light 230 is located. For example, the local control system 210 may determine that an errant driver has run the red light, and may not immediately change the phase of traffic lights in perpendicular directions of travel to green.

Figure 3:
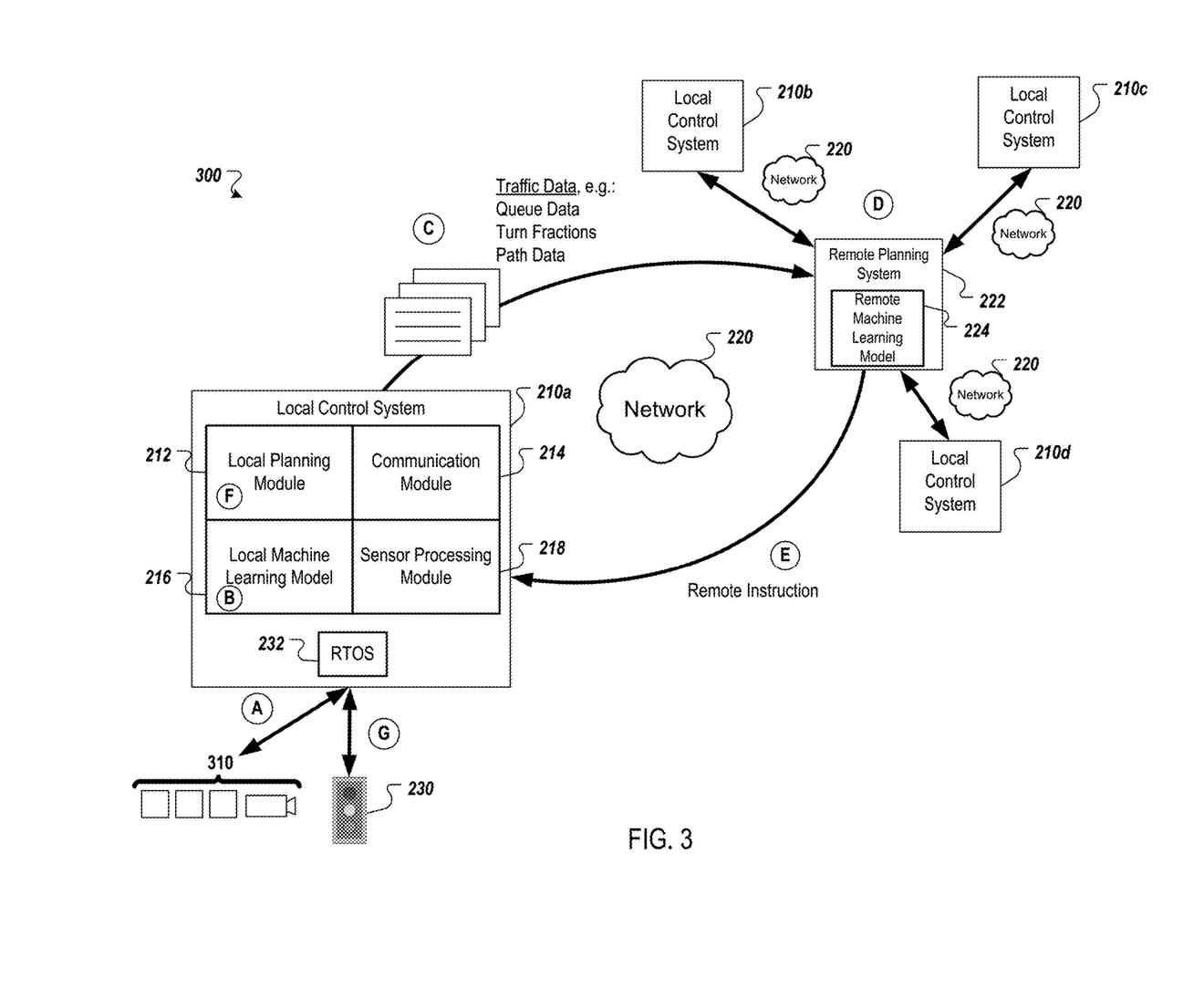
FIG. 3 is a system diagram that illustrates an example of a process for controlling a traffic light at a traffic intersection.

FIG. 3 is a system diagram that illustrates an example of a process 300 for controlling a traffic light at a traffic intersection. The process 300 may be performed by a system such as the traffic light control system 200.

The process 300 spans stages (A) through (G). Stages (A) to (G) may occur in the illustrated sequence, or they may occur in a suitable sequence that is different than in the illustrated sequence. In some examples, the process 300 is repeated. In some examples, only certain stages of the process 300 is repeated.

The process 300 begins with stage (A), in which a particular local control system 210a receives sensor data from sensors 310 associated with a particular traffic light 230. In some examples, the sensors 310 include a camera. In some examples, the camera located proximate to the traffic light 230 provides camera data to local control system 210. In some examples, the sensor data includes a phase of the traffic light 230. For example, the sensor data may indicate that the traffic light 230 is currently red. In some examples, the sensor data includes a phase of other control devices at the intersection. For example, the intersection may have multiple traffic lights, walk lights, dynamic traffic signs, etc. In some examples, the sensor data may include the phase of each of the control devices. In some examples, other sensors, including range imaging sensors, microwave sensors, inductive loops, RGB cameras, IR cameras, multi-spectral cameras, hyper-spectral cameras, directional sensors, radar, lidar, audio sensors such as microphones, and/or other sensors are used.

In some examples, the sensor processing module 218 processes the sensor and camera data and provides the processed data to the local machine learning model 216. In some examples, the sensor processing module 218 processes the sensor data collected by the sensors 310 and combines multiple sensor inputs. For example, the sensor processing module 218 may use sensor fusion to synchronize sensor inputs. In some examples, the sensor processing module 218 may use filters and techniques, such as a Kalman filter, extended Kalman filter, the Dempster-Shafer theory, a Bayesian networks, the Central Limit Theorem, etc. to synchronize sensor inputs.

In some examples, the sensor processing module 218 uses machine learning techniques to analyze and synchronize sensor input. For example, the sensor processing module 218 may be a model which accepts sensor data collected by cameras and/or other sensors as inputs. The sensor processing module 218 may use any of a variety of models such as decision trees, linear regression models, logistic regression models, neural networks, classifiers, support vector machines, inductive logic programming, ensembles of models (e.g., using techniques such as bagging, boosting, random forests, etc.), genetic algorithms, Bayesian networks, etc., and can be trained using a variety of approaches, such as deep learning, perceptrons, association rules, inductive logic, clustering, maximum entropy classification, learning classification, etc. In some examples, the sensor processing module 218 may use supervised learning. In some examples, the sensor processing module 218 may use unsupervised learning.

The process 300 continues in stage (B) in which the local control system 210a uses the local machine learning model 216 to generate traffic data. The local machine learning model 216 may operate on and process data in a similar fashion to the local machine learning models described above with respect to FIG. 1. In some examples, the local machine learning model 216 includes multiple machine learning models that operate separately and simultaneously. For example, the local machine learning model 216 may include models that have been trained to identify vehicles, pedestrians, obstacles, etc.

As described above with respect to FIG. 2, in some examples, the local machine learning model 216 may be a model which accepts sensor data collected by cameras and/or other sensors as inputs. The local machine learning model 216 may use any of a variety of models such as decision trees, linear regression models, logistic regression models, neural networks, classifiers, support vector machines, inductive logic programming, ensembles of models (e.g., using techniques such as bagging, boosting, random forests, etc.), genetic algorithms, Bayesian networks, etc., and can be trained using a variety of approaches, such as deep learning, perceptrons, association rules, inductive logic, clustering, maximum entropy classification, learning classification, etc. In some examples, the local machine learning model 216 may use supervised learning. In some examples, the local machine learning model 216 use unsupervised learning.

The local machine learning model 216 may determine the number of vehicles passing through an intersection, the road segments of the intersection from which the vehicles originated, and the road segments of the intersection to which the vehicles are travelling. The local machine learning model 216 may determine turn fractions for each road segment of the intersection, paths represented as origin-destination pairs, etc. The local control system 210a then transmits the generated traffic data including the determined vehicle counts, pedestrians, obstructions, turn fractions, etc. to the remote planning system 222.

During stage (C), the local control system 210a provides the generated traffic data to the remote planning system 222 through the network 220. In some examples, the network 220 is a wired network to which each traffic light 230, local control system 210, and sensor, is connected. In some examples, the network 220 is a wireless network. The local control system 210a may provide the generated traffic data using the communication module 214 over the network 220 to the remote planning system 222. In some examples, the traffic data may include raw or processed sensor data collected by cameras and/or other sensors. In some examples, the traffic data includes queue data, path data, vehicle counts, turn fractions, etc.

In some examples, the traffic data includes metadata, or features extracted from sensor data, including image or video data. In some examples, video data, image data, and or other sensor data is collected, processed to determine metadata, and then discarded to reduce storage requirements. The incoming sensor data feed can be analyzed in substantially real time, at the local control module 210, to determine the metadata. In general, the system may be implemented so that sensor data is not transmitted to the remote planning system 222 or any other remote system, and is also not stored by the local control module 210.

This metadata can provide valuable insight into traffic patterns and current and past conditions. For example, the data could provide data associated with planning, management, and enactment of policies and laws related to how people move around. For example, city managers may want to have information for planning how to design and re-design parts of the cities; for real-time feedback and actuation; and for evaluating the impact of changes they have made. This data can be collected across various scales, e.g., across a hamlet, a city, a state, a continent, etc. Valuable data for all of these purposes are embedded in sensor data collected by cameras and/or other sensors.

The system 200 may analyze and tag this sensor data to extract valuable metadata and to use these data without requiring additional long-term storage of the full sensor data feed (e.g., video feed). This has many benefits including greater preservation of privacy and reduction of storage costs. For example, the system may anonymize any metadata collected before transmitting the metadata over the network (e.g., network 230) so that only metadata, and not personal data, is sent. Additionally, users of the system 200 may avoid time-consuming embroilment with disputes. For example, with only anonymized metadata and no raw video feed, a city cannot be called upon to report who is at fault in a car accident because, as a matter of course, the video is not saved or made available to any other systems.

The system 200 may use computer vision techniques to determine metadata that provides information on how many pedestrians are crossing at which intersections at given times of the day, where pedestrians are crossing besides at intersections. In some examples, the system 200 provides metadata indicating the frequency of "close calls" when pedestrians are endangered and other environmental factors or events that occur at the time. As another example, the metadata can indicate locations where pedestrians are crossing besides at intersections. As additional examples, the metadata can indicate counts of incidents or frequency of incidents such as pedestrians jay-walking, cars running red lights, drivers talking on the cell phone while driving, etc. The system 200 may provide metadata indicating how cyclists are interacting with traffic, how vehicles, such as buses, cars, and taxis are interacting. The system 200 can provide metadata indicating how a bus lane or bike lane or parking lane is being used, as well as provide vehicle counts, such as car counts and bicycle counts, etc. The metadata can provide baseline information about the use of traffic infrastructure, which can be compared with later-generated metadata to determine the effect of changes. For example, after making a change, such as installing a bench, widening a road, etc., changes in usage indicated by the metadata can demonstrate whether the changes effectively addressed the reasons for the change.

The system 200 may extract such metadata using existing infrastructure, such as existing cameras in a city. In some examples, the system 200 uses machine vision techniques to recognize people and vehicles, with algorithms and training adjusted to the specific case. The collected and processed data can then be connected to various actuation mechanisms. For example, the metadata can be used in enforcement and emergency response situations. In some examples, the system 200 may supplement current red-light camera and CCTV systems by using metadata to direct an enforcement officer or first responders to a scene. In some examples, the system 200 may use a closed-loop feedback to adjust the timing of traffic signals to account for a queue length of vehicles accumulating in a traffic intersection. In some examples, using machine vision techniques to determine vehicle counts is more accurate than using existing sensors, such as induction loops, which often do not register motorcycles as vehicles due to the smaller shift in electromagnetic field produced by the smaller metal mass of a motorcycle as compared to a larger vehicle, such as a passenger car. In some examples, the system 200 can account for extraordinary circumstances by prioritizing certain vehicles such as buses or trucks in an HOV lane, or to accommodate pedestrians who have been waiting for a long time to cross at a busy intersection.

In some examples, the system 200 may be connected to actuators and/or dynamic signage, to adjust switchable, dynamic, or counterflow lanes based on traffic along the passageway where those lanes exist or based on predicted traffic due to observed upstream traffic. For example, the system 200 may control electronic traffic signs to change from a stop sign to a yield sign when there is little traffic where the sign is placed.

In some examples, the system 200 may perform real-time rerouting of public transit to accommodate traffic and/or demand. For example, the system 200 may open certain lanes and close certain lanes to direct high-volume traffic during rush hour. The system 200 may provide the extracted metadata as input to simulation or modeling tools or other tools for the purposes of planning. For example, vendors and service providers may use the extracted metadata to monitor consumer reaction to their products. Vendors and/or service providers may adjust what, how much, and where they are providing products or services based on the extracted metadata. In some examples, this adjustment can be a response to immediate conditions. In some examples, users can use metadata to effect a change in future planning based on current conditions, or to make an adjustment to present or future planning based on historical observations.

During stage (D), the remote planning system 222 receives the generated traffic data from local control systems 210a-210d controlling traffic lights at different intersections. The remote planning system 222 uses the traffic data, along with the remote machine learning model 224, to generate a remote control instruction for each of the local control systems 210a-210d. For example, by inputting the received traffic data to a trained model 224, the remote planning system 222 can determine timings and offsets of signal phases to improve efficiency and reduce traffic congestion.

In some implementations, the remote planning system 222 receives traffic data collected from sensors that are not proximate to traffic intersections. For example, the remote planning system 222 may receive traffic data from mobile devices of travellers. Mobile devices of travellers may include various forms of mobile devices, such as personal digital assistants, cellular telephones, smart-phones, and other similar computing devices. The traffic data may include aggregate speed along a road in a particular direction of travel. For example, the traffic data may include an estimated average speed of a vehicle travelling northbound on I-95. In some examples, the traffic data may include origin and/or destination data. For example, location data from a user's mobile device may be used to supplement traffic data collected by sensors, including cameras, at a traffic intersection to determine metadata such as turn fractions, vehicle speed, origin-destination pairs, etc.

For situations in which the systems discussed here collect personal information about users, or may make use of personal information, the users may be provided with an opportunity to control whether programs or features collect personal information (e.g., information about a user's social network, social actions or activities, profession, a user's preferences, or a user's current location), or to control whether and/or how to receive content from the content server that may be more relevant to the user. In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained (such as to a city, ZIP code, or state level), so that a particular location of a user cannot be determined. Thus, the user may have control over how information is collected about him or her and used by a content server.

In some implementations, the remote planning system 222 uses reinforcement learning to update and improve the remote machine learning model 224. In this particular example, the remote planning system 222 is shown receiving generated traffic data from multiple local control systems 210a-d, though the remote planning system 222 could receive traffic data from more or fewer local control systems 210.

As described above with respect to FIG. 2, in some examples, the remote machine learning model 224 may be a model which accepts sensor data collected by cameras and/or other sensors as inputs. The remote machine learning model 224 may use any of a variety of models such as decision trees, linear regression models, logistic regression models, neural networks, classifiers, support vector machines, inductive logic programming, ensembles of models (e.g., using techniques such as bagging, boosting, random forests, etc.), genetic algorithms, Bayesian networks, etc., and can be trained using a variety of approaches, such as deep learning, perceptrons, association rules, inductive logic, clustering, maximum entropy classification, learning classification, etc. In some examples, the remote machine learning model 224 may use supervised learning. In some examples, the remote machine learning model 224 uses unsupervised learning.

In some examples, the remote machine learning model 224 uses reinforcement learning to determine which actions to take in a particular traffic situation. For example, the remote machine learning model 224 may use a Markov decision process. In some examples, the remote machine learning model 224 may use approaches such as the criterion of optimality, brute force, direct policy search, or value functions, including Monte Carlo methods or temporal difference methods.

The remote planning system 222 may update the remote machine learning model 224 by calculating new weights that modify inputs (e.g., traffic data) to the neural network of the remote machine learning model 224. For example, the remote planning system 222 may determine, based on the received traffic data from the multiple local control systems 210a-d that queue data is the biggest factor in traffic congestion for that particular subset of intersections, and may determine that a larger weight must be used for queue data inputs to the local machine learning model 224.

Part of updating the remote machine learning model 224 can include conducting experiments or implementing behavior changes among traffic lights and assessing the outcomes. For example, the remote machine learning model 224 may extend the green light phase by 5 seconds for certain intersections, or at certain times. By introducing variations to the operations of traffic signals and observing changes to the outcomes, the remote machine learning model 224 can be trained to determine which traffic control patterns are most effective at particular times or situations for particular intersections and for the road network as a whole. In some examples, the remote machine learning model 224 can use various "explore and exploit" techniques, in which data is acquired or used. For example, the remote machine learning model 224 can use variations of solutions for the multi-armed bandit problem or the contextual bandit problem (e.g., an Epsilon-greedy strategy, and Epsilon-first strategy, an Epsilon-decreasing strategy, an adaptive or contextual strategy, etc.), a greedy algorithm, etc.

When the remote machine learning model 224 is updated, the updated remote machine learning model 224 is used to generate a remote instruction. In some examples, the remote instruction is generalized to all intersections under the purview of the remote planning system 222. In some examples, the remote instruction may be customized to the intersection controlled by the local control system 210, the portion of the intersection controlled by the local control system 210, the particular traffic light 230, etc.

The process 300 continues with stage (E), during which the remote planning system 222 transmits the generated remote instruction to the local control system 210a through the network 220. In this particular example, the remote planning system 222 may also transmit the generated remote instruction to the local control systems 210b-d.

In some examples, the remote instruction can include updated weights to modify the local machine learning model 216. For example, the remote planning system 222 may determine from the received traffic data that the turn fractions are not an important factor in regulating the flow of traffic at intersections controlled by local control systems 210a-d. In this particular example, in which the local machine learning model 216 uses a neural network, the remote planning system 222 may transmit a remote instruction including reduced weights for turn fraction inputs to the local machine learning model 216. In some examples, updated weights for inputs to the local machine learning models may be determined through sensor fusion. For example, the sensor processing module 218 may learn about the reliability and effective range of a given sensor. The local machine learning model 216 may be a model which accepts sensor data collected by cameras and/or other sensors as inputs. The local machine learning model 216 may use any of a variety of models such as decision trees, linear regression models, logistic regression models, neural networks, classifiers, support vector machines, inductive logic programming, ensembles of models (e.g., using techniques such as bagging, boosting, random forests, etc.), genetic algorithms, Bayesian networks, etc., and can be trained using a variety of approaches, such as deep learning, perceptrons, association rules, inductive logic, clustering, maximum entropy classification, learning classification, etc. In some examples, the local machine learning model 216 may use supervised learning. In some examples, the local machine learning model 216 use unsupervised learning.

In some examples, the remote instruction may provide new decision-making parameters, e.g., weights, thresholds, and/or other parameters of the local machine learning model 216, used by the local planning module 210a. For example, the local planning module 210a may use a formula to determine a local control instruction to provide the traffic light 230. In this particular example, the remote instruction may include a larger weight for the pedestrian crossing variable when determining whether to extend a light phase of the traffic light 230 to reduce accidents involving pedestrians. The remote planning system 222 may provide different sets of parameters to the local control systems 210a-210d, as the remote planning system 222 finds most appropriate. For example, the remote planning system 222 may determine that no cars are travelling east or west through the intersection for which the local control system 210a is responsible. The remote planning system 222 may also receive local traffic data from the local control system 210c indicating that the left turn fraction for the northern arm is 1. In this particular example, the remote planning system 222 may then provide a different set of parameters or use a different local machine learning model 216 to determine parameters for the local control system 210a than for the local control system 210c. For example, the remote planning system 222 may issue a remote instruction to the local control system 210a reducing the weight applied to the western arm and eastern arm variables in the local machine learning model 216a, while adding a left turn fraction variable to the model used to determine parameters for the remote instruction provided to the local control system 210c.

In some examples, the remote instruction may include control instructions for the traffic light 230. For example, the remote instruction may include an instruction to keep the traffic light 230 red for four minutes while a queue clears at an adjacent intersection.

The process 300 continues with stage (F), in which the local control system 210a makes a local decision based on remote instruction and generates local control instruction. In some examples, the local control system 210a may override the remote instruction when generating the local control instruction. For example, the local control system 210a may ignore a generalized remote instruction to extend a yellowto-red transition phase of the traffic lights at the intersection if there is a low accident rate at the particular intersection.

The process 300 continues with stage (G), in which the local control instruction generated by the local control system 210a and the remote instruction generated by the remote planning system 222 are transmitted to the RTOS 232 that controls the traffic light 230. The RTOS 232 uses the local control instruction, the remote instruction, and the generated traffic data from the local control system 210 to generate a traffic control signal to control the traffic light 230. The RTOS 232 may override the local control instruction if the generated traffic data indicates a condition which would not be safe. For example, if a police officer has chased a suspect through a red light at the intersection for a direction perpendicular to the direction for which the traffic light 230 controls traffic, the RTOS 232 may ignore local and remote instructions to change from red to green.

In another example, global traffic data may suggest that, because traffic is heavy heading north along a road, green light phases for traffic lights at intersections along the road in the northern direction, including a particular intersection, should be extended. The RTOS 232 may determine from local traffic data, however, that an emergency vehicle is approaching the intersection from the west. Based on the combined remote and local traffic data, the RTOS 232 may control the traffic light for traffic heading north along the road at the intersection to change phase to yellow and then to red in order to allow the emergency vehicle to cross the intersection.

The control operations discussed can occur substantially in real-time. For example, the local control modules 210a-210d can provide traffic data at regular intervals, e.g., every 10 seconds, every 30 seconds, or at another interval. The remote planning system 222 can provide remote control instructions as needed, which may or may not be at a fixed interval. For example, the remote planning system 222 may provide instructions to perform a certain pattern of light phase changes for a range of time, or until further instructions are provided. In addition, or as an alternative, the remote planning system 222 may dynamically and/or asynchronously send instructions to some or all local control systems 210a-210d in an area to respond to temporary or unusual conditions also.

In some examples, the machine learning models, local and remote, may be updated substantially in real-time. For example, the machine learning models can be updated at regular intervals, e.g., every 10 seconds, every 30 seconds, or at another interval. The machine learning models can be updated as control instructions and data are received, which may or may not be at a fixed interval. In addition, or as an alternative, the machine learning models may be updated dynamically and/or asynchronously to respond to temporary or unusual conditions.

In some examples, the local machine learning models may use federated learning. For example, by updating local machine learning models with weights determined by a remote planning system that receives data from multiple different intersections, the system 200 provides a system-level reinforcement learning through the network. Generalized rules gleaned from a high-level view of traffic conditions may be applied to local control systems to improve traffic flow.

Additionally, different intersections with different local control systems may be updated to use different parameters in the local machine learning models to focus on important variables for the particular intersection. The distributed control of the intersections allows the use of customized parameters, and thus traffic flow control at each intersection may be fine-tuned and optimized according to traffic conditions at the particular intersections.

The remote planning system may conduct testing of traffic control techniques across multiple intersections. For example, the remote planning system may shorten all red light phases for all traffic lights in half of the intersections in a city. The remote planning system then analyzes the results of the change and applies any changes to be made across multiple intersections. In this particular example, if shortening all red light phases increased travel time by an average of fifteen minutes, the remote planning system may revert the lengths of the red light phases to their original lengths. The remote planning system may update the remote machine learning models to reflect the results of the testing. In some examples, the testing, analysis, and updating of the remote machine learning models is part of an automated process run by the remote planning system. For example, the remote planning system may be given a set of variables to change. In some examples, the remote planning system may automatically determine variables that could be tested and perform the tests.

By modelling traffic control at a system level, high-level results that improve traffic conditions and assist authorities, such as emergency responders, can theoretically be achieved. For example, at the remote planning level, the system may be controlled to synchronize traffic light phases to prepare intersections to deal with a pile-up causing a queue, several fire trucks rushing to the scene of a fire, police officers in pursuit of a suspect in a high speed chase, etc.

Figure 4:
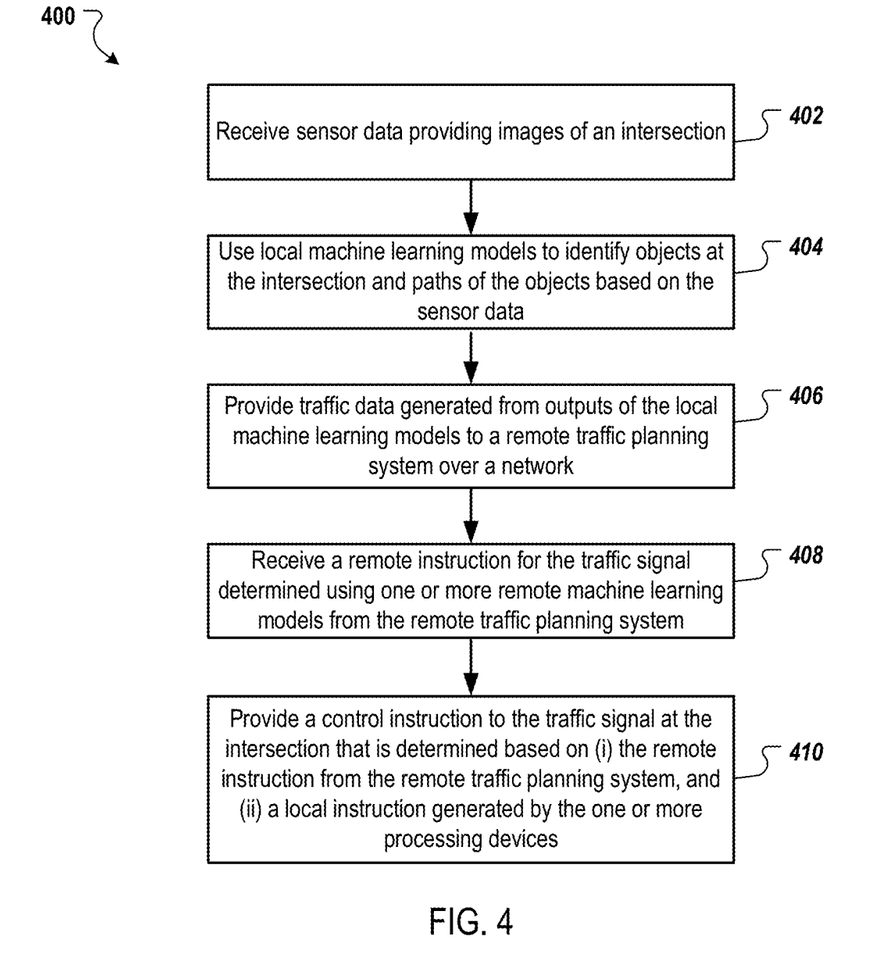
FIG. 4 is a flow diagram that illustrates an example of a process for controlling a traffic light at a traffic intersection.

FIG. 4 is a flowchart of an example process 400 for controlling a traffic light at a traffic intersection. The process 400 may be performed by a system such as the traffic light control system 200.

One or more processing devices configured to control a traffic signal at an intersection of roads receives sensor data providing images of an intersection by processing devices (402). In some examples, the sensor data includes data collected by cameras and/or other sensors. For example, referring to FIG. 2, the local control system 210 may receive camera data from cameras proximate to the traffic signal 230.

The one or more processing devices use one or more local machine learning models to identify objects at the intersection and paths of the objects based on the sensor data (404). For example, the local control system 210 may use the local machine learning model 216 to identify objects, such as vehicles, pedestrians, bicycles, etc., at the intersection and respective paths of the vehicles, pedestrians, bicycles, etc. based on the camera data provided by cameras proximate to the traffic light 230.

The one or more processing devices may provide traffic data generated from outputs of the local machine learning models to a remote traffic planning system over a network (406). For example, the local control system 210 may use the communication module 214 to provide the generated traffic data to the remote planning system 222 over the network 220.

The one or more processing devices may receive a remote instruction from the remote traffic planning system for the traffic signal determined using one or more remote machine learning models (408). For example, the remote planning system 222 may use the remote machine learning model 224 to generate a remote instruction. The remote planning system 222 may transmit to the remote instruction over the network 220 to the local control system 210.

The one or more processing devices may provide a control instruction to the traffic signal at the intersection that is determined based on the remote instruction from the remote traffic planning system and a local instruction generated by the one or more processing devices (410). For example, the local planning module 212 may generate a local control instruction based on the received traffic data from the cameras proximate to the intersection. The local control system 210 may provide the remote instruction, the local instruction, and the generated traffic data to the RTOS 232. The RTOS 232 may analyze the remote instruction, the local instruction, and the generated traffic data to generate a traffic light control instruction. The RTOS 232 may then control the traffic light 230 using the traffic light control instruction. In some examples, the local machine learning model 216 can generate control instructions and provide the instructions directly to the traffic light 230.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array), an ASIC (application specific integrated circuit), or a GPGPU (General purpose graphics processing unit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method comprising:
   executing, by one or more processing devices, a real-time operating system configured to control a traffic signal at an intersection of roads, the one or more processing devices being located proximate to the intersection;
   receiving, by the one or more processing devices, camera data providing images of the intersection;
   using, by the one or more processing devices, one or more local machine learning models to identify objects at the intersection and paths of the objects based on the camera data;
   providing, by the one or more processing devices, traffic data generated from outputs of the one or more local machine learning models to a remote traffic planning system over a network;
   receiving, by the one or more processing devices and from the remote traffic planning system, a remote instruction for the traffic signal determined using one or more remote machine learning models;
   generating, by the one or more processing devices, a local instruction for the traffic signal based at least in part on the outputs of the one or more local machine learning models, wherein the local instruction is different from the remote instruction;
   providing, by the one or more processing devices and as input to the real-time operating system, (i) the remote instruction from the remote traffic planning system, (ii) the local instruction generated by the one or more processing devices, and (iii) the traffic data generated from outputs of the one or more local machine learning models; and
   providing, by the one or more processing devices, a control instruction to the traffic signal at the intersection, wherein the control instruction is generated by the real-time operating system based on the remote instruction, the local instruction, the traffic data, and a predetermined set of rules.

2. The method of claim 1, further comprising:
   determining, by the one or more processing devices and using the one or more local machine learning models and further based on the camera data, a classification for a condition at the intersection;
   generating, by the one or more processing devices, the local instruction based on the classification; and
   altering the remote instruction based on the local instruction;
   wherein providing the control instruction to the traffic signal comprises providing the altered remote instruction.

3. The method of claim 1, further comprising:
   determining, by the one or more processing devices and using the one or more local machine learning models and further based on the camera data and phase data for the traffic signal indicating a current phase of the traffic signal, a classification for a condition at the intersection;
   generating, by the one or more processing devices, the local instruction based on the classification; and
   based on the classification, overriding the remote instruction based on the local instruction to operate the traffic signal contrary to the remote instruction.

4. The method of claim 1, further comprising:
   determining, by the one or more processing devices and for each of multiple different paths through the intersection, a count of objects of a particular type traversing the path, the multiple different paths representing multiple different origin-destination pairs,
   wherein providing the traffic data comprises providing the count of objects of the particular type traversing the path.

5. The method of claim 4, wherein providing the traffic data comprises providing data indicating a speed of the counted objects of a particular type.

6. The method of claim 1, wherein providing the traffic data comprises providing one or more measures indicating relative amounts of vehicles taking different paths through the intersection.

7. The method of claim 1, wherein the remote planning system uses reinforcement learning by receiving and taking into account traffic data received from other intersections located proximate to the intersection.

8. The method of claim 1, further comprising periodically providing, at a predetermined interval, traffic data generated from outputs of the one or more local machine learning models to a remote traffic planning system over a network.

9. The method of claim 1, wherein the traffic data is collected by a camera, and wherein the camera has a view of an entrance and an exit of the intersection.

10. The method of claim 9, wherein the camera includes a conical mirror, and wherein the camera has a 360° view of the intersection.

11. The method of claim 1, wherein the output of the one or more machine learning models is based on data from at least one of a lidar or a radar system arranged to detect objects at the intersection.

12. The method of claim 1, further comprising:
   receiving, by the one or more processing devices and from the remote traffic planning system, customized machine learning model parameters for the one or more local machine learning models.

13. The method of claim 1, further comprising:
using, by the one or more processing devices, the one or more local machine learning models to classify a condition at the intersection or to assess a speed of an identified object.

14. The method of claim 1, further comprising:
storing, by the one or more processing devices and in a database, parameters for generating local control instructions;
accessing, by the one or more processing devices, the database to retrieve the parameters; and
generating, by the one or more processing devices and based on the parameters and an output of the one or more local machine learning models, a particular local control instruction.

15. The method of claim 1, comprising generating the control instruction by selecting, by the real-time operating system, the control instruction from among the local instruction and the remote instruction.

16. The method of claim 1, comprising generating the control instruction by ignoring, by the real-time operating system, the local instruction and the remote instructions based on one or more conditions indicated by the traffic data.

17. The method of claim 1, wherein the traffic data comprises data, determined based on output of the one or more local machine learning models, that indicates the presence of one or more types of non-vehicle objects at the intersection.

18. The method of claim 12, wherein the customized machine learning model parameters provided by the remote traffic planning system include values determined by the remote planning system based on data from multiple different intersections.

19. A system comprising:
one or more processing devices; and
one or more non-transitory machine-readable media storing instructions that, when executed by the one or more processing devices, cause the one or more processing devices to perform operations comprising:
  executing, by one or more processing devices, a real-time operating system configured to control a traffic signal at an intersection of roads, the one or more processing devices being located proximate to the intersection;
  receiving camera data providing images of the intersection;
  using one or more local machine learning models to identify objects at the intersection and paths of the objects based on the camera data;
  providing traffic data generated from outputs of the one or more local machine learning models to a remote traffic planning system over a network;
  receiving, from the remote traffic planning system, a remote instruction for the traffic signal determined using one or more remote machine learning models;
  generating a local instruction for the traffic signal based at least in part on the outputs of the one or more local machine learning models, wherein the local instruction is different from the remote instruction;
  providing, by the one or more processing devices and as input to the real-time operating system, (i) the remote instruction from the remote traffic planning system, (ii) the local instruction generated by the one or more processing devices, and (iii) the traffic data generated from outputs of the one or more local machine learning models; and
  providing a control instruction to the traffic signal at the intersection, wherein the control instruction is generated by the real-time operating system based on the remote instruction, the local instruction, the traffic data, and a predetermined set of rules.

20. One or more non-transitory machine-readable media storing instructions that, when executed by one or more processing devices, cause the one or more processing devices to perform operations comprising:
  executing, by one or more processing devices, a real-time operating system configured to control a traffic signal at an intersection of roads, the one or more processing devices being located proximate to the intersection;
  receiving camera data providing images of the intersection;
  using one or more local machine learning models to identify objects at the intersection and paths of the objects based on the camera data;
  providing traffic data generated from outputs of the one or more local machine learning models to a remote traffic planning system over a network;
  receiving, from the remote traffic planning system, a remote instruction for the traffic signal determined using one or more remote machine learning models;
  generating a local instruction for the traffic signal based at least in part on the outputs of the one or more local machine learning models, wherein the local instruction is different from the remote instruction;
  providing, by the one or more processing devices and as input to the real-time operating system, (i) the remote instruction from the remote traffic planning system, (ii) the local instruction generated by the one or more processing devices, and (iii) the traffic data generated from outputs of the one or more local machine learning models; and
  providing a control instruction to the traffic signal at the intersection, wherein the control instruction is generated by the real-time operating system based on the remote instruction, the local instruction, the traffic data, and a predetermined set of rules.

\* \* \* \* \*